(12) United States Patent
Wolverton et al.

(10) Patent No.: US 7,678,362 B2
(45) Date of Patent: Mar. 16, 2010

(54) HIGH DENSITY HYDROGEN STORAGE MATERIAL

(75) Inventors: Christopher Mark Wolverton, Saline, MI (US); Gregory J. Lewis, Santa Curz, CA (US); John J. Low, Schaumburg, IL (US)

(73) Assignees: UOP LLC, Des Plaines, IL (US); Ford Global Technologies, LLC, Dearborn, MI (US)

( * ) Notice: Subject to any disclaimer, the term of this patent is extended or adjusted under 35 U.S.C. 154(b) by 794 days.

(21) Appl. No.: 11/471,443

(22) Filed: Jun. 20, 2006

(65) Prior Publication Data

US 2006/0292065 A1 Dec. 28, 2006

Related U.S. Application Data

(60) Provisional application No. 60/692,332, filed on Jun. 20, 2005.

(51) Int. Cl.
*C01B 3/04* (2006.01)
*C09K 3/00* (2006.01)

(52) U.S. Cl. .............. 423/648.1; 252/182.32; 252/182.33; 423/658.2

(58) Field of Classification Search .............. 423/648.1, 423/658.2; 252/182.32, 182.33
See application file for complete search history.

(56) References Cited

U.S. PATENT DOCUMENTS

2006/0046930 A1* 3/2006 Au .............................. 502/400
2006/0194695 A1* 8/2006 Au .............................. 502/400

FOREIGN PATENT DOCUMENTS

| JP | 2001-253702 | * | 9/2001 |
|----|----|----|----|
| WO | WO 01/85606 A1 | | 11/2001 |
| WO | WO 02/062701 A1 | | 8/2002 |
| WO | WO 02/066369 A1 | | 8/2002 |
| WO | WO 2004/024845 A2 | | 3/2004 |
| WO | WO 2004/031642 A2 | | 4/2004 |
| WO | WO 2004/050798 A2 | | 6/2004 |
| WO | WO 2004/096700 A1 | | 11/2004 |
| WO | WO 2005/023706 A2 | | 3/2005 |

* cited by examiner

*Primary Examiner*—Wayne Langel
(74) *Attorney, Agent, or Firm*—Damian Porcari; Dinsmore & Shohl LLP

(57) ABSTRACT

A hydrogen storage material. The hydrogen storage material is a combination of $LiBH_4$ with $MH_x$, wherein greater than about 50% of M comprises Al.

5 Claims, 1 Drawing Sheet

US 7,678,362 B2

HIGH DENSITY HYDROGEN STORAGE MATERIAL

CROSS-REFERENCE

This application claims the benefit of provisional application U.S. Application Ser. No. 60/692,332 filed Jun. 20, 2005 entitled "High Density Hydrogen Storage Material."

STATEMENT REGARDING FEDERALLY SPONSORED RESEARCH OR DEVELOPMENT

This invention was made with government support under Contract No. DE-FC36-04GO14013. The government has certain rights in the invention.

BACKGROUND OF THE INVENTION

The present invention relates generally to hydrogen storage materials, and more particularly to high density hydrogen storage materials.

Hydrogen is desirable as a source of energy because it reacts cleanly with air producing water as a by-product. Hydrogen-fueled vehicles, such as hydrogen internal-combustion engine ($H_2$ICE) or hydrogen fuel cell ($H_2$FC) vehicles, require an efficient means of storing hydrogen as a fuel on-board the vehicle. Although on-board reforming of hydrocarbons could solve the problem of hydrogen storage, it is widely dismissed today as energetically inefficient. On-board reforming could also negate many of the potential environmental benefits associated with $H_2$ICE or $H_2$FC vehicles. A strong enabler towards achieving full customer acceptance and wide-scale commercial viability across a wide array of vehicle platforms would be hydrogen-fueled vehicles that meet or exceed attributes of current gasoline internal combustion engine (ICE) vehicles, such as vehicle range and cost. Assuming that a hydrogen storage system should not take substantially more volume or weight than today's gasoline fuel storage systems, but should effectively deliver the same energy content puts an extremely high burden on the density of the hydrogen storage systems. Even under the most optimistic scenarios of fuel cell efficiencies, the resulting hydrogen storage density far outpaces currently available technologies, both by volume and by weight. Finding a high density material for hydrogen storage is one of the key bottlenecks towards the widespread use of hydrogen-fueled vehicles.

Currently available technologies for hydrogen storage fall into several broad categories: physical storage, chemical storage, and reversible solid-state storage. Physical storage includes high-pressure tanks and cryogenic liquid storage of $H_2$. Storage of $H_2$ in gaseous form, even at very high pressures such as 10,000 psi (700 bar), results in a very low energy density by volume. Comparing the energy densities contained in the fuel, gasoline has about 6 times the energy density by volume of 10,000 psi $H_2$ and about 10 times the density of 5,000 psi $H_2$. Cryogenic storage of hydrogen in liquid form improves the volumetric density, although it still does not approach the density of gasoline. In addition, there are complications associated with on-board cryogenic storage, such as latency/boil-off.

Chemical storage, such as the $NaBH_4$ (Millenium Cell) approach, involves a compound that liberates $H_2$ when reacted. The reactions are often with water. However, the reactions transform the fuel into a byproduct that must be recycled back into fuel off-board the vehicle. Current technologies suffer from unacceptably high energetic costs to recycle the fuels.

Reversible solid-state storage is an approach in which $H_2$ is liberated from a solid state material by applying heat, and the spent material can be regenerated on-board the vehicle by applying $H_2$ under pressure. This approach is attractive because it improves the volumetric density of the stored $H_2$, and it even has the potential to exceed the density of liquid $H_2$. It also avoids the problems of off-board regeneration associated with the chemical storage techniques. Current reversible solid-state storage materials suffer from one of two significant drawbacks (or both): 1) the storage material is very heavy, so while the volumetric density can be high, the density by weight, or gravimetric density, is low; or 2) the storage material binds the hydrogen too strongly, and thus requires too much heat/energy to liberate the $H_2$.

Therefore, there is a need for a light weight hydrogen storage material with high storage density, and hydrogen binding that will allow the material to reversibly store and release hydrogen with modest energy input.

SUMMARY OF THE INVENTION

The present invention meets that need by providing a suitable hydrogen storage material. It is a light weight material with a high storage density. It has hydrogen binding that should make it easily reversible at near-ambient temperatures. The storage material is $LiBH_4$ combined with $MH_x$, wherein greater than about 50% of M comprises Al.

Another aspect of the invention is a hydrogen storage material comprising $LiBH_4$ combined with $MH_x$, wherein greater than about 50% of M comprises Al, wherein the hydrogen storage material has an enthalpy of reaction in a range of from about 50 to about 80 kJ/mol $H_2$, wherein the hydrogen storage material reversibly stores at least 8 wt % $H_2$, and wherein the hydrogen storage material has a single-crystal volumetric density about 50% higher than liquid $H_2$.

Another aspect of the invention is a method of reversibly producing a source of hydrogen gas. The method includes providing a hydrogen storage material comprising $LiBH_4$ combined with $MH_x$, wherein greater than about 50% of M comprises Al; heating the hydrogen storage material at a temperature less than 100° C. to release hydrogen and forming a spent hydrogen storage material; and regenerating the hydrogen storage material by exposing the spent hydrogen storage material to hydrogen gas under elevated pressure and temperature.

BRIEF DESCRIPTION OF THE DRAWINGS

The figure is a graph showing the decomposition enthalpies (i.e., the negative of the formation enthalpies) of various metal diborides.

DETAILED DESCRIPTION OF THE INVENTION

Figure 1:
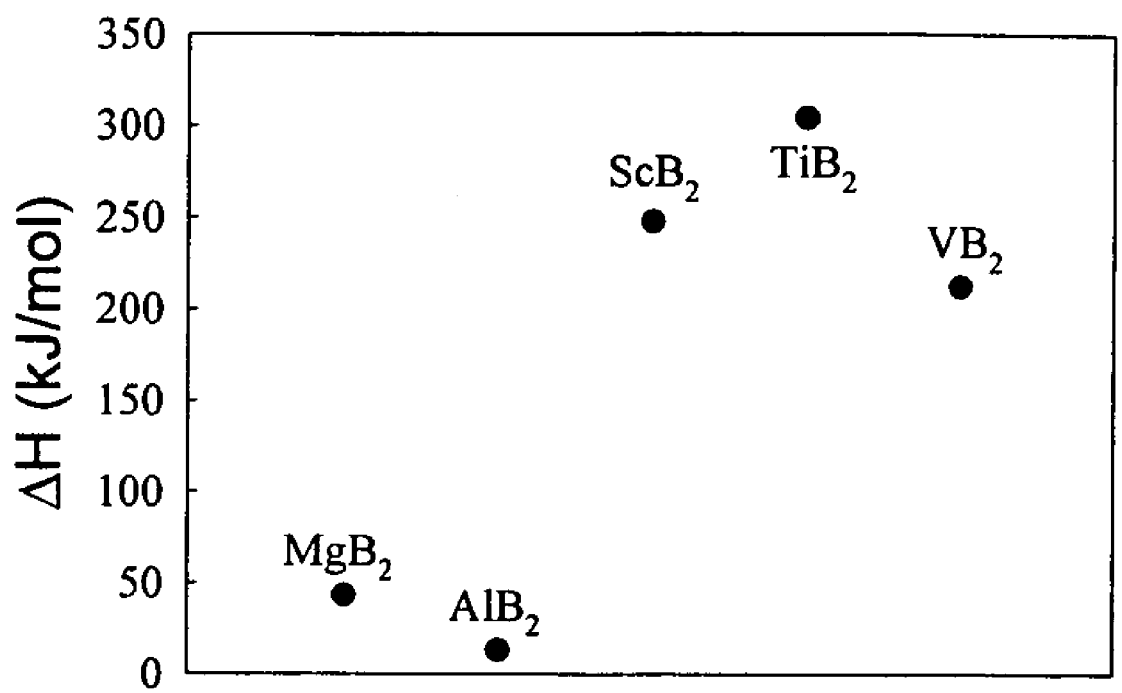

Lithium borohydride, $LiBH_4$, appears to be an excellent candidate for a hydrogen storage material. $LiBH_4$ has an extremely high density of hydrogen, both by weight (18.5 wt %) and by volume (38.4$H_2$/nm$^3$), which is nearly twice that of liquid $H_2$ (21.1 $H_2$/nm$^3$), and more than five times the density of compressed 350 bar hydrogen (7.0 $H_2$/nm$^3$).

However, $LiBH_4$ has long been viewed as an irreversible chemical storage compound in the class of Millennium Cell approaches (e.g., $NaBH_4$), where hydrogen is released by reacting the compound with water, forming a byproduct that cannot be recharged on-board the vehicle. In contrast, reversible metal hydrides liberate hydrogen by application of heat, and can be reversibly rehydrided back to their initial state by applying elevated pressure. $LiBH_4$ has not been considered in this "reversible hydride" class because the hydrogen is bound so strongly that it can be released only at very high temperatures, and the compound cannot be subsequently regenerated with pressure. Significant hydrogen is not released from $LiBH_4$ below temperatures of about 500° C. (typical PEM fuel cells operate at about 80° C.), well above the melting point of the compound (~270° C.), where the decomposition takes place presumably through a reaction such as:

$$2LiBH_4 \rightarrow 2LiH + 2B + 3H_2 \quad (1)$$

The hydrogen in LiH is even more strongly bound and virtually inaccessible, as LiH remains stable up to 900° C. To date, rehydriding the combination of LiH and B back to $LiBH_4$ has proved impossible, despite attempts up to 650° C. and 150 bar.

Recently, a procedure was described to make $LiBH_4$ reversible by mixing it with magnesium hydride, $MgH_2$. Magnesium hydride is another material that, similar to $LiBH_4$, contains a high density of hydrogen, but binds it too strongly to be practical for on-board storage applications. $MgH_2$ requires about 300° C. to decompose according to the reaction:

$$MgH_2 \rightarrow Mg + H_2 \quad (2)$$

However, reaction (2) is reversible, i.e., $MgH_2$ can be formed from Mg and $H_2$ by applying pressure. The $LiBH_4 + MgH_2$ mixture is believed to be effectively "destabilized" by this mixture, allowing one to reversibly store 8-10 wt. % $H_2$ via the following reaction:

$$2LiBH_4 + MgH_2 \rightarrow MgB_2 + 2LiH + 4H_2 \quad (3)$$

Reaction (3) is "effectively" destabilized relative to the sum of reactions (1) and (2) due to the formation of $MgB_2$ in reaction (3) as opposed to Mg+2B in reactions (1) and (2). The formation of the boride stabilizes the right-hand side of reaction (3) and hence effectively destabilizes the $LiBH_4/MgH_2$ mixture.

Although the discovery of this $LiBH_4/MgH_2$ mixture providing reversible 8-10 wt. % $H_2$ represents a significant step forward, it is still impractical because the reported mixture of reaction (3) still requires much too high a temperature (300° C.-400° C.) for hydrogen desorption. In other words, although the mixture is destabilized, it is not destabilized enough.

The temperature for hydrogen desorption from a solid-state system at fixed pressure is largely determined by the enthalpy of reaction (since the entropic contribution is dominated by that of $H_2$ gas, and is therefore largely constant across a wide variety of reaction types). To desorb $H_2$ at about 1-700 bar between 0-85° C., the material should have an enthalpy of reaction in the range of about 20-50 kJ/mol $H_2$. Current materials that desorb $H_2$ below 85° C. typically reversibly store only about 1-3 wt. % $H_2$. Examples of these current state-of-the-art low-temperature hydrides are metal hydrides based on $LaNi_5$, TiFe, or V, as well as $NaAlH_4$. Materials which have a known higher density currently have enthalpies outside this range, either more than about 50 kJ (i.e., they bind $H_2$ too strongly), or less than about 20 kJ (i.e., they bind $H_2$ too weakly). Thus, a high-density storage material desirably should have a hydrogen release reaction that has a reaction enthalpy in the targeted range of roughly ΔH of about 20-50 kJ/mol $H_2$.

Using density functional theory (DFT), a number of reactions were identified which had high gravimetric and volumetric density and an enthalpy in the targeted range of about 20-50 kJ/mol $H_2$. The DFT results are shown in Table 1. The results were validated by considering reactions which are known to occur only at high temperatures. The first three lines give energetics of reactions that are experimentally known to occur only at high temperatures. In agreement with experimental observations, the decomposition of $LiBH_4$, whether into $LiH+B+3/2H_2$ or into $Li+B+2H_2$, possesses an enthalpy (81.6 and 102.9 kJ/mol $H_2$, respectively) higher than the targeted range. $MgH_2$ also shows a decomposition enthalpy (62.6 kJ) outside the targeted range. The agreement between these calculated energetics and experimental observations of decomposition reactions supports the present invention. The reaction enthalpy of the $LiBH_4/MgH_2$ mixture has a lower enthalpy (66.1 kJ) than pure $LiBH_4$ itself (81.6 kJ), which is in agreement with the recently reported work on this mixture. Thus, the mixture effectively serves to destabilize $LiBH_4$.

TABLE I

Energetics of reactions involving destabilized $LiBH_4$

| Reaction | wt. % $H_2$ | Single-Crystal Volumetric Density $(H_2/nm^3)*$ VASP (PAW-GGA) | ΔH (kJ/mol $H_2$) |
|---|---|---|---|
| Dehydriding $LiBH_4$ | | | |
| $2LiBH_4 \rightarrow 2LiH + 2B + 3H_2$ | 13.9 | 28.8 | +81.6 |
| $LiBH_4 \rightarrow Li + B + 2H_2$ | 18.5 | 38.4 | +102.9 |
| Dehydriding $MgH_2$ | | | |
| $MgH_2 \rightarrow Mg + H_2$ | 7.7 | 32.8 | +62.6 |
| "Destabilizing" $LiBH_4$ by mixing with $MgH_2$ | | | |
| $2LiBH_4 + MgH_2 \rightarrow MgB_2 + 2LiH + 4H_2$ | 11.6 | 29.7 | +66.1 |
| $2LiBH_4 + Mg \rightarrow MgB_2 + 2LiH + 3H_2$ | 8.9 | 23.6 | +67.2 |
| Present invention | | | |
| $4LiBH_4 + 2AlH_3 \rightarrow 2AlB_2 + 4LiH + 9H_2$ | 12.4 | 32.6 | +54.9 |
| $4LiBH_4 + 2Al \rightarrow 2AlB_2 + 4LiH + 6H_2$ | 8.6 | 26.7 | +77.2 |
| $4LiBH_4 + MgH_2 \rightarrow MgB_4 + 4LiH + 7H_2$ | 12.4 | 29.3 | +68.4 |
| $2LiBH_4 + TiH_2 \rightarrow TiB_2 + 2LiH + 4H_2$ | 8.6 | 31.8 | +22.0 |

TABLE I-continued

Energetics of reactions involving destabilized $LiBH_4$

| Reaction | wt. % $H_2$ | Single-Crystal Volumetric Density $(H_2/nm^3)$* VASP (PAW-GGA) | $\Delta H$ (kJ/mol $H_2$) |
|---|---|---|---|
| $2LiBH_4 + VH_2 \rightarrow VB_2 + 2LiH + 4H_2$ | 8.4 | 32.6 | +25.1 |
| $2LiBH_4 + ScH_2 \rightarrow ScB_2 + 2LiH + 4H_2$ | 8.9 | 30.5 | +49.2 |
| $2LiBH_4 + CrH_2 \rightarrow CrB_2 + 2LiH + 4H_2$ | 8.3 | 33.0 | +34.7 |
| $2LiBH_4 + 2TiH_2 \rightarrow 2TiB + 2LiH + 5H_2$ | 7.0 | 34.0 | +44.1 |
| $2LiBH_4 + 2Fe \rightarrow 2FeB + 2LiH + 3H_2$ | 3.9 | 25.9 | +33.2 |
| $2LiBH_4 + 4Fe \rightarrow 2Fe_2B + 2LiH + 3H_2$ | 2.3 | 20.0 | +22.2 |

*For comparison, other volumetric densities (in units of $H_2/nm^3$):
Liquid $H_2$ at 20 K: 21.2
Compressed $H_2$ at 350 bar (300 K): 7.0
Compressed $H_2$ at 700 bar (300 K): 11.7
DOE 2005 Target: 10.8
DOE 2010 Target: 13.6
DOE 2015 Target: 24.4
$NaAlH_4 \rightarrow NaH + Al + 3/2 H_2$ (VASP-GGA): 22.0

We considered reactions that contain a high density of $H_2$, but with energetics that fall within the targeted range for near-ambient desorption. Specifically, we searched for reactions of the form:

$$y LiBH_4 + MH_x \rightarrow MB_y + y LiH + \frac{3y+x}{2} H_2 \quad (4)$$

using known stable metal hydrides, $MH_x$, and known stable metal borides, $MB_y$. We limited our search to relatively lightweight elements, and show results for:

$M$=Al ($x$=3 and 0; $y$=2), $M$=Mg ($x$=2 and 0; $y$=2 and 4), $M$=Ti ($x$=2; $y$=2 and 1), $M$=V ($x$=2; $y$=2), $M$=Sc ($x$=2; $y$=2), $M$=Cr ($x$=2; $y$=2), and $M$=Fe ($x$=0; $y$=1 and ½.

The figure shows the decomposition enthalpies of various diborides. The decomposition enthalpy is the negative of the formation enthalpy (a positive value indicates a stable boride).

Compared to the reported mixture of $LiBH_4/MgH_2$, the M=Al mixture of $LiBH_4/AlH_3$ provides enhanced storage density and further destabilization. However, there are some caveats associated with the use of Al. Changing $MgH_2$ to $AlH_3$ does further destabilize the reaction and increase the weight percent, but the heat of hydriding is higher than the targeted range (+55 kJ/mol $H_2$). In addition, rehydriding to form the very weakly-bonded $AlH_3$ might be a problem. The Al might combine to form alanate (e.g., $LiAlH_4$) rather than alane ($AlH_3$) which is unstable at ambient conditions. If the Al doesn't form $AlH_3$ upon rehydriding, but rather just remains Al metal, then the following reaction results upon subsequent cycles:

$4LiBH_4 + 2Al \rightarrow 2AlB_2 + 4LiH + 6H_2$.

The calculations show this reaction has a large heat of reaction (77.2 kJ/mol $H_2$), and thus would require a large amount of heat to liberate the hydrogen on subsequent cycles. The heat of hydriding for $AlH_3$ (less than about 80 kJ/mol $H_2$) is somewhat higher than the targeted range. Despite these difficulties, $LiBH_4/AlH_3$ can be useful in some circumstances.

A series of new reactions are predicted in Table I that possess high gravimetric and volumetric densities and have an enthalpy of reaction in the targeted range of about 20-50 kJ/mol $H_2$. The reactions of type (4) in Table I with M=Ti, V, Cr, and Sc are predicted to have enthalpies of reaction largely within the targeted range of 20-50 kJ/mol $H_2$, contain between 8-9 wt. % $H_2$, and have single-crystal volumetric densities approximately 50% higher than liquid $H_2$. These proposed reactions involving mixtures of $LiBH_4$ with $TiH_2$, $VH_2$, $CrH_2$, and $ScH_2$ provide a very significant destabilizing of $LiBH_4$, and the thermodynamics allow for hydrogen desorption near ambient conditions, utilizing only waste heat from $H_2$ fuel cell or $H_2$ internal combustion engine vehicles. Reactions of the type (4) in Table I with M=Fe also contain enthalpies of reaction near the targeted range, but with somewhat lower gravimetric densities (2-4 wt. %).

The existence of the series of reactions provides a likelihood of alloying to achieve specifically tailored properties. For the 3d transition metals M=Ti, V, Cr, and Sc, each of the hydrides in this series, $TiH_2$, $VH_2$, $CrH_2$, and $ScH_2$ forms with the same crystal structure ($CaF_2$-type) and is likely to possess mutual solubility and therefore alloying potential. The borides in this series, $TiB_2$, $VB_2$, $CrB_2$, and $ScB_2$, also form the same crystal structure (and the same structure as $MgB_2$ and $AlB_2$). Again, it is likely that solubility between these borides exists and could lead to significant alloying possibilities. Alloying these hydrides and borides could essentially allow one to tailor specific properties to precisely the values desired. Specific examples of the properties that could be tailored via alloying are: thermodynamics/heat of formation, optimum volumetric density, reactions with low volume change between hydrided/dehydrided states, low cost, or some optimal combination of the above properties.

For example, using alloying of Ti, V, Cr, and Sc, the general reaction would be of the form:

$2LiBH_4 + (Ti, V, Cr, Sc)H_2 \rightarrow (Ti, V, Cr, Sc)B_2 + 2LiH + 4H_2$ (5)

Preliminary results demonstrate the possibility of alloying these hydrides and borides. For instance, it is well known that there is complete solubility between $MgB_2$ and $AlB_2$. By performing a calculation of a hypothetical $(Mg_{0.5}Al_{0.5})B_2$ cell, we can estimate the heat of mixing of this mixture of $MgB_2/AlB_2$. We find $\Delta H_{mix}[(Mg_{0.5}Al_{0.5})B_2]$ about $-11.5$ kJ/mol formula unit showing that the mixed state is stable relative to the pure borides, in agreement with experiment. This simple test indicates that these types of computations can be used to predict whether or not alloying will occur between various hydrides or borides.

Another advantage of the use of 3d transition metal hydrides to destabilize $LiBH_4$ is in the possible use of these metals as catalyst atoms to promote the kinetics of hydriding/dehydriding in other complex hydride systems. Doping $NaAlH_4$ with a small amount of Ti is known to cause a significant acceleration of the kinetics of this material. Other 3d transition metals have similar effects, although not quite as good. In our reactions, a significant amount of 3d transition metal is already involved (e.g., in the form of $TiH_2$), and thus could have a similar catalytic/kinetic effect to these metals in other systems.

Generally, greater than about 50% of M comprises Al. Other metal hydrides can also be included, typically less than about 30%, less than 20%, less than 10%, or less than 5%.

Another benefit of reducing $\Delta H$ involves refueling. Just as heat is required to extract $H_2$ during operation, the reverse reaction of rehydriding the system during refueling will generate heat, often in significant quantities. For instance, even for $NaAlH_4$ with $\Delta H=37$ kJ, a 5.6 kg $H_2$ system will liberate about 100 MJ. For a 10 minute refueling, this corresponds to an average of cooling of about 170 kW. Obviously, reducing $\Delta H$ will also reduce the amount of cooling required during refueling.

The significant destabilization of $LiBH_4$ by the additions with M=Ti, V, Cr, and Sc can be easily understood in terms of the decomposition/formation energies of the borides with these metals M. We can rewrite the enthalpy for reaction (4) as:

$$\Delta H(\text{reaction } 4) = \frac{2}{3y+x} \left[ \frac{3y}{2} \Delta H(LiBH_4/H_2) + \frac{x}{2} \Delta H(MH_x/H_2) - \Delta H(MB_y/M) \right] \quad (6)$$

where $\Delta H(LiBH_4/H_2)$ is the enthalpy of $LiBH_4$ decomposition (per $H_2$) via reaction (1), $\Delta H(MH_x/H_2)$ is the enthalpy of the metal hydride $MH_x$ decomposition (per $H_2$), and $\Delta H(MB_y/M)$ is the decomposition enthalpy of the metal boride, $MB_y$ (per M atom) (i.e., the negative of the formation enthalpy for $MB_y$—a positive value indicates a stable boride). For the specific case of x=y=2 ($MH_2$ and $MB_2$), this expression becomes:

$$\Delta H(\text{reaction } 4; y = x = 2) = \frac{1}{4} \quad (7)$$

$$[3\Delta H(LiBH_4/H_2) + \Delta H(MH_2/H_2) - \Delta H(MB_2/M)]$$

From these expressions (6) and (7), it is clear that the enthalpy of reaction (4) is given by the average of the decomposition enthalpies of $LiBH_4$ and $MH_2$ and effectively destabilized by the formation enthalpy of the boride. The figure shows the first-principles calculated $\Delta H$ values for metal diborides, $MB_2$. These energies show that the transition metal diborides have much larger enthalpies of decomposition than the borides with Mg or Al. These larger $\Delta H$ values thus explain the larger amount of destabilization of $LiBH_4$ for the reactions involving the transition metal borides.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of reversibly producing a source of hydrogen gas comprising:
    providing a hydrogen storage material comprising $LiBH_4$ combined with $MH_x$, wherein greater than about 50% of M comprises Al and when M is Al then x=3, or 0;
    heating the hydrogen storage material at a temperature less than 100° C. to release hydrogen and forming a spent hydrogen storage material; and
    regenerating the hydrogen storage material by exposing the spent hydrogen storage material to hydrogen gas under elevated pressure and temperature.

2. The method of claim 1 wherein the hydrogen storage material has an enthalpy of reaction of less than about 80 kJ/mol $H_2$.

3. The method of claim 1 wherein the hydrogen storage material reversibly stores at least 8 wt % $H_2$.

4. The method of claim 1 wherein the hydrogen storage material has a single-crystal volumetric density about 50% higher than liquid $H_2$.

5. The method of claim 1 wherein less than 50% of M is Ti, V, Cr, Sc, Fe, or combinations thereof.

* * * * *